United States Patent [19]

Graber

[11] 3,994,425
[45] Nov. 30, 1976

[54] AUTOMOBILE BICYCLE CARRIER

[76] Inventor: Joseph V. Graber, 3739 County Trunk M, Middleton, Wis. 53562

[22] Filed: Dec. 15, 1975

[21] Appl. No.: 640,734

[52] U.S. Cl. .................... 224/29 R; 224/42.03 B; 224/42.1 E; 211/17; 211/20
[51] Int. Cl.² .......................................... B60P 3/06
[58] Field of Search ....... 224/29 R, 42.03 B, 42.1 F, 224/42.1 E; 214/450; 211/17, 18, 19, 20, 21, 22

[56] References Cited
UNITED STATES PATENTS

| | | |
|---|---|---|
| 3,204,839 | 9/1965 | Yuda et al. ............. 224/42.03 B UX |
| 3,687,318 | 8/1972 | Casey et al. ..................... 214/450 |
| 3,901,421 | 8/1975 | Kalicki et al. ................. 224/29 R |

*Primary Examiner*—Robert J. Spar
*Assistant Examiner*—Jerold M. Forsberg
*Attorney, Agent, or Firm*—Morsbach & Pillote

[57] ABSTRACT

An automobile bicycle carrier of the type including a pair of upwardly opening channels for receiving the wheels of a bicycle and a support frame for mounting the channels in spaced parallel relation on a vehicle and for engaging the frames of the bicycles resting in each of the channels to support the same in upright position. The support frame is formed of a plurality of separate and detachably connected frame members and includes a pair of front frame members that are attached to the channels and which are detachably interconnected to each other intermediate the channels and a corresponding pair of rear frame members which are connected to the channels and detachably interconnected intermediate the channels to support the channels in spaced parallel relation. One of the front and rear frame members each have a leg that extends upwardly with a laterally extending arm at its upper end for engaging and supporting the frame of the bicycle in a respective one of the channels. The frame members can be disassembled from the channels and from each other to enable compact packaging for shipment or storage.

8 Claims, 6 Drawing Figures

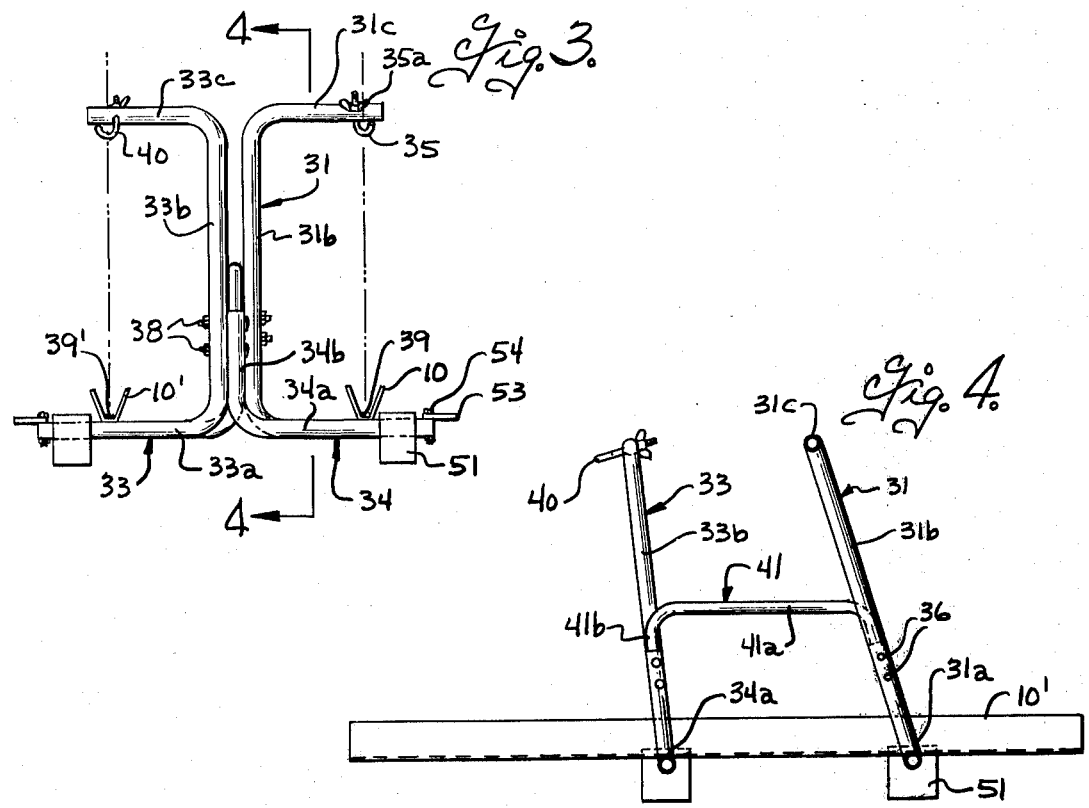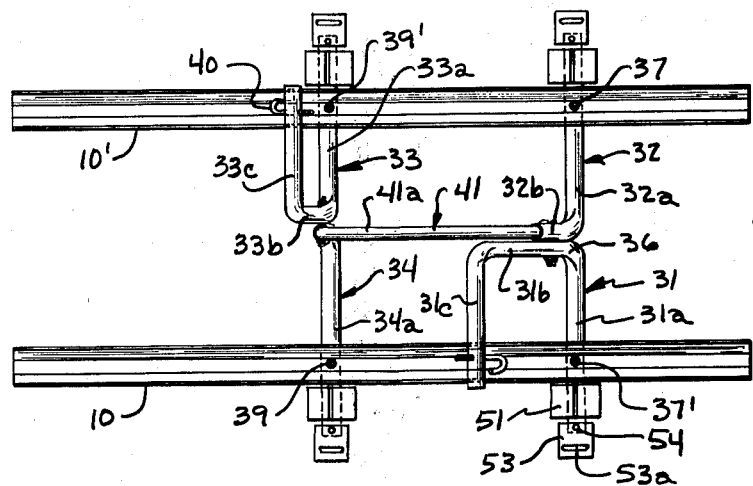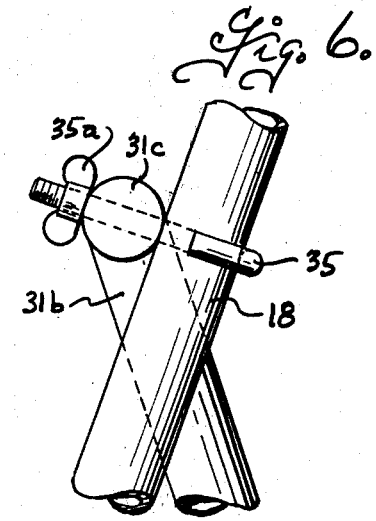

AUTOMOBILE BICYCLE CARRIER

BACKGROUND OF THE INVENTION

Automobile bicycle racks have heretofore been made utilizing a pair of upwardly opening channels mounted in relatively parallel relation on a pair of cross-frame members and with a bicycle support in the form of a generally upright U-shaped frame having its lower ends attached to the cross-frame members intermediate the channels and having laterally extending arms adjacent its upper ends for engaging and supporting a bicycle resting in a respective one of the channels. The U-shaped frame, even when disassembled from the cross-frame members, was large and required a large size package which was bulky and could not be shipped by some carriers having limitations on the combined length and girth of the packages which they would handle.

SUMMARY OF THE INVENTION

Various important objects of this invention are to provide an automobile bicycle carrier which can be disassembled and packaged in a compact package; wherein the several parts that form the carrier can be easily and economically fabricated; wherein the number of fasteners required to assemble the carrier is minimized to not only reduce cost but to simplify assembly; and which the carrier is light in weight and yet provides a stable support for the bicycles on the vehicle.

These, together with other objects and advantages of this invention will be more readily understood by reference to the following detailed description when taken in connection with the accompanying drawings wherein:

FIG. 3 is an end elevational view of the bicycle carrier;

FIG. 4 is a longitudinal sectional view through the bicycle carrier taken on the plane 4—4 of FIG. 3;

FIG. 5 is a top planned view of the automobile bicycle carrier; and

FIG. 6 is a fragmentary view on an enlarged scale illustrating the mechanism for clamping a portion of the bicycle frame to the carrier.

Figure 1:
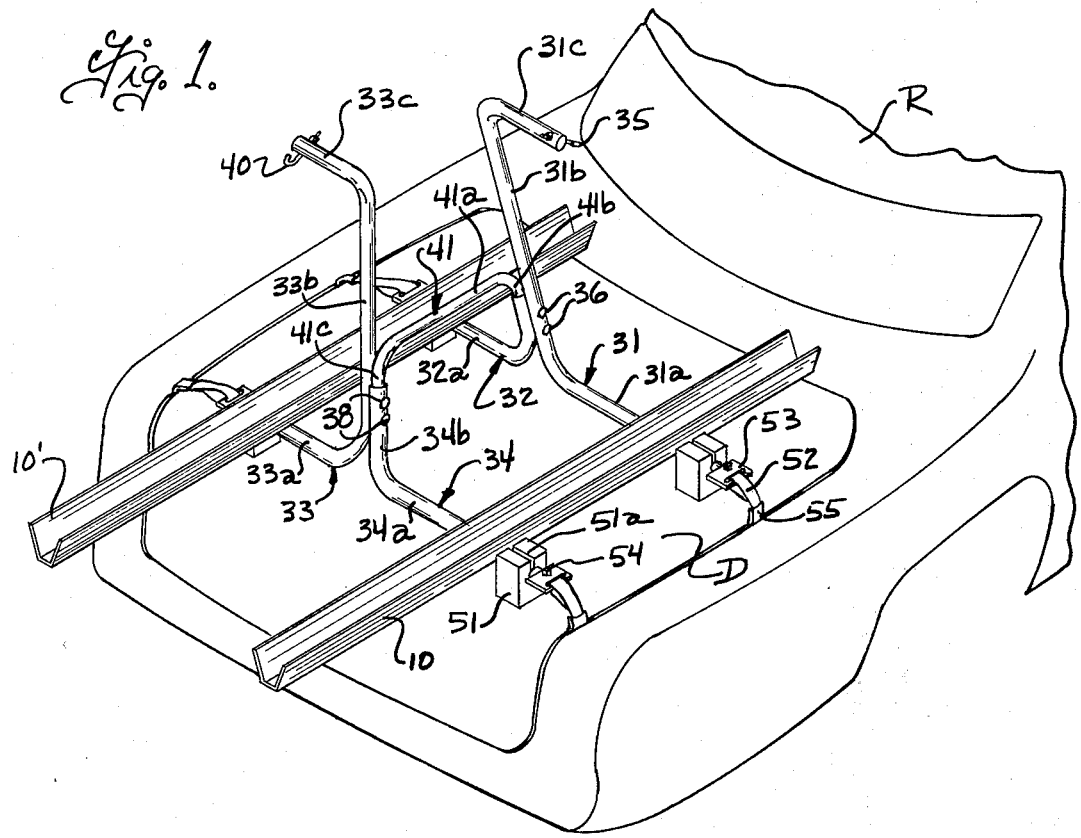
FIG. 1 is a perspective view of the automobile bicycle carrier shown mounted on the trunk deck of an automobile.
Figure 2:
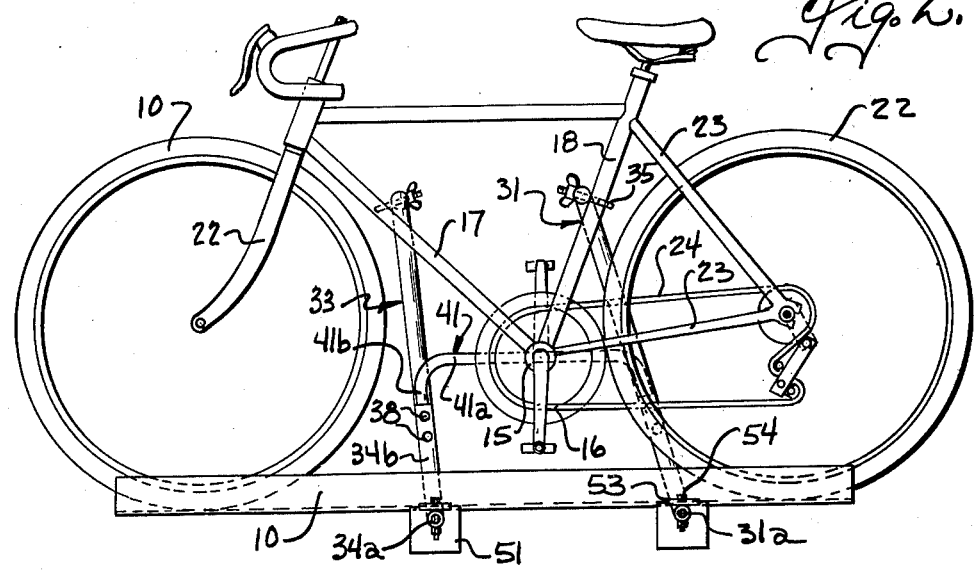
FIG. 2 is a side elevational view of the automobile bicycle carrier with the bicycle shown mounted thereon.

The automobile bicycle carrier is adapted for mounting on either the trunk deck D or the roof R of an automobile and, in general, includes a pair of elongated upwardly opening channels 10, 10' and a frame structure which is formed of a plurality of separate detachably interconnected frame members for mounting the channels on the vehicle and for supporting the bicycles in the channels. A typical bicycle is shown in FIG. 2 mounted on the carrier and includes a hub 15 for rotatably supporting a crank 16, front and rear frame members 17 and 18 which extend upwardly from the hub, a front wheel 19 rotatably supported in a fork 20 controlled by handle bars 21 and a rear wheel 22 mounted on rearwardly extending frame members 23 and driven by a chain and sprocket drive 24. The channels 10, 10' are selected to have a length somewhat greater than the wheel base of bicycles so as to receive the front and rear wheels 19 and 22 of the bicycle therein to not only support the bicycle but also to inhibit turning of the front wheel about the fork axis.

The support frame for mounting the channels on the vehicle and for supporting the bicycles in the channel is formed from a number of separate frame members which, when disassembled, can be packaged in a compact package and which can be readily assembled into a rigid frame. The support frame includes first and second frame members 31 and 32, hereinafter sometimes referred to as front frame members, and third and fourth frame members 33 and 34, hereinafter sometimes referred to as rear frame members. The frame members are each formed of tubular stock by simple bending and punching operations. The first frame member 31 has a generally U-shaped configuration including a generally horizontal lower leg 31a attached to one of the channels 10 intermediate its ends, an upwardly extending leg 31b that extends upwardly between the channels, and an upper leg 31c that extends laterally from the upwardly extending leg into overlying relation to the channel 10. A bicycle clamp means, conveniently in the form of a J-bolt 35 is mounted on the leg 31c for adjustment by a wing nut 35a to clamp a bicycle to the frame member 31. The second frame member 32 has a generally L-shaped configuration and includes a generally horizontal leg 32a attached to the second channel 10' and an upwardly extending leg 32b that extends alongside the upwardly extending leg 31b of the first frame member. The upwardly extending legs 31b and 32b of the first and second frame members are detachably connected together in side-by-side relation by bolts 36 that extend through punched openings in the upwardly extending legs and the horizontal legs 31a and 32a of the first and second frame members extend in relative opposite directions and crosswise of the channels and the legs 31a and 32a are detachably secured to the channels as by bolts 37 and 37' that extend through openings in the base of the channels and through openings in the respective horizontal leg.

The third frame member 33 includes a generally horizontal leg 33a that is attached to the second channel 10', and upwardly extending leg 33b that extends upwardly between the channels and an upper leg 33c that extends laterally from the upper end of the upwardly extending leg in overlying relation to the channel 10'. A bicycle clamp in the form of a J-bolt 40 is provided on the leg 33c for clamping a bicycle frame to the frame member 33. The fourth frame member 34 has a generally L-shaped configuration with a generally horizontal leg 34a and an upwardly extending leg 34b. The upwardly extending leg 34b extends alongside the upwardly extending leg 33b of the frame member 33 and is detachably secured thereto as by bolts 38 that extend through aligned openings in the upwardly extending members, and the leg 34a extends in a direction opposite leg 33a and crosswise of the channel members. Legs 33a and 34a are attached to the respective channel members 10' and 10 at locations spaced therealong from the first and second frame members, as by bolts 39, 39'.

The front frame members and the rear frame members are rigidly interconnected to each other to stabilize the support frame in a direction lengthwise of the channels by a longitudinally extending frame member 41, also of tubular configuration, having a longitudinally extending leg 41a and front and rear downwardly extending legs 41b and 41c that are telescopically received in the upwardly extending legs 32b and 34b on the second and fourth frame members. The downwardly extending legs 41b and 41c are also formed with openings to receive the bolts 36 and 38 so that the bolts that hold the front and rear frame members together also secure the longitudinally extending frame member.

The frame is mounted on the vehicle by resilient supports 51 and tied on straps 52. The resilient supports can be in form of suction cups commonly used for mounting racks on vehicles but are preferably in the form of blocks of resilient material such as resilient foamed plastic which have a keyhole shape slot 51a for receiving the horizontally extending legs of the frame members to support the same in spaced relation to the vehicle trunk deck D or roof R. The tie down straps 52 are attached to the ends of the horizontally extending legs on the frame members and, as shown, a plate 53 is fastened as by bolt 54 to the end of each horizontally extending leg and the plate has a slot 53a for receiving the strap 52. A hook 55 is provided on each strap for engaging either the edge of the trunk deck or the drain bead on the roof.

It is desirable to be able to open the trunk lid when the rack is mounted and, in order to provide clearance at the forward end of the rack, the channels are preferably attached to the horizontal legs of the frame members so that the forward projection of the channels is less than the rear projection. The frame members, however, are preferably arranged so that the upper legs 31c and 33c on the first and third frame members respectively are located generally symmetrically with respect to the longitudinal center of the channel. Stated otherwise, the leg 31c is offset forwardly from the longitudinal center line of the channels a distance substantially the same as the leg 33c is offset rearwardly from the longitudinal center line of the channels. With this arrangement, the rear frame member 18 on one bicycle positioned in channel 10 can be clamped to one leg 31c on the front frame members with the bicycle facing rearwardly with respect to the vehicle (to the left as shown in FIG. 2), and a second bicycle can be positioned in the other channel 10' facing forwardly (to the right as viewed in FIG. 2) with the rear frame member 18 on that bicycle clamped to the other leg 33c. For example, the channels can be made approximately 4 feet long and the legs 31c, 33c offset respectively forwardly and rearwardly from the longitudinal center line of the channels approximately 6 inches and spaced above the base of the channels about 21½ inches. When arranged in this manner, bicycles facing in relatively opposite directions can have their rear frame members clamped to the legs 31c and 33c and both bicycles will be approximately longitudinally centered in their respective channels. Alternatively, both bicycles can be arranged to face in the same direction with one arm clamped to the rear frame member 18 and the other arm clamped to the forward frame member 17.

From the foregoing it is felt that the construction and use of the bicycle rack will be readily understood. The support frame is formed of a plurality of separate and detachably interconnected frame members 31, 32, 33, 34, and 41, each of which is formed of tubular stock and requires only simple bending and punching operations. The rack can thus be easily and economically formed and, when disassembled, can be packaged in a compact package for storage and transportation. The rack can be readily assembled with a minimum of fasteners and, when the frame members are assembled, they not only support the channels in spaced parallel relation but also provide a firm and stable support for the bicycles resting in the respective channels.

The embodiments of the invention in which an exclusive property or privilege is claimed are defined as follows:

1. In an automobile bicycle carrier for supporting at least two bicycles, said carrier including a pair of upwardly opening channels each adapted to receive the front and rear wheels of a bicycle, and a support frame for mounting the channels in spaced parallel relation and for engaging a portion of the frame of a bicycle in each channel to support the same, the improvement wherein said support frame comprises:
   a. first and second front frame members each having a generally horizontal leg attached to respective ones of said channels to extend transverse thereto and an upwardly extending leg, said upwardly extending legs on the first and second front frame members being disposed in side-by-side relation intermediate the channels and front fastener means detachably interconnecting the upwardly extending legs on the first and second front frame members;
   b. first and second rear frame members each having a generally horizontal leg attached to respective ones of said channels to extend transverse thereto and an upwardly extending leg, said horizontal legs on said first and second rear frame members being attached to the channels at locations spaced therealong from the front frame members and said upwardly extending legs on said first and second rear frame members being disposed in side-by-side relation intermediate the channels, and rear fastener means detachably interconnecting the upwardly extending legs on the first and second rear frame members,
   c. the upwardly extending leg on said first front frame member extending to a level substantially above the channels and having an arm extending laterally of the upper end thereof into overlying relation to one of said channels, the upwardly extending leg on said first rear frame member extending to a level substantially above the channels and having an arm extending laterally from its upper end into overlying relation to the other of said channels,
   d. frame connecting means attachably connecting one of the upwardly extending legs on one of the front frame members to one of the upwardly extending legs on one of the rear frame members at a level above the channels,
   e. clamp means on each of said arms for detachably engaging a portion of the frame of a bicycle resting in the channel below the respective arm, and
   f. means for mounting the carrier on a vehicle.

2. A bicycle carrier according to claim 1 wherein said frame connecting means includes a longitudinal frame member having legs at opposite ends respectively connected to at least one of the front and rear frame members.

3. A bicycle carrier according to claim 1 wherein each of said front and rear frame members are tubular and said frame connecting means includes a longitudinal frame member having downwardly extending legs at its front and rear ends extending into the upwardly extending legs on the second front and rear frame members respectively.

4. A bicycle carrier according to claim 3 wherein said front and rear fastener means respectively engage the downwardly extending legs on the front and rear ends of the longitudinal frame member.

5. A bicycle carrier according to claim 3 wherein the arm on said first front frame member overlies the channel connected to the horizontal leg on the first front frame member and the arm on the first rear frame member overlies the channel connected to the horizontal leg on the first rear frame member.

6. A bicycle carrier according to claim 1 wherein the arm on said first front frame member overlies the channel connected to the horizontal leg on the first front frame member and the arm on the first rear frame member overlies the channel connected to the horizontal leg on the first rear frame member.

7. In an automobile bicycle carrier for supporting at least two bicycles, said carrier including first and second upwardly opening channels each adapted to receive the front and rear wheels of a bicycle, and a support frame for mounting the channels in spaced parallel relation and for engaging a portion of the frame of a bicycle in each channel to support the same, the improvement wherein said support frame includes:
 a. a first one-piece frame member of generally U-shaped configuration having a generally horizontal lower leg attached to said first channel, an upwardly extending leg extending upwardly between the channels, and an upper leg extending laterally of the upwardly extending leg into overlying relation to said first channel, a second one-piece frame member of generally L-shaped configuration having a generally horizontal leg attached to said second channel and an upwardly extending leg extending alongside the upwardly extending leg of the first frame member, a first fastener means for detachably connecting the upwardly extending legs on the first and second frame members,
 b. a third one-piece frame member of generally U-shaped configuration having a generally horizontal lower leg attached to said second channel, an upwardly extending leg extending upwardly between the channels, and an upper leg extending laterally of said upwardly extending leg into overlying relation to said second channel, a fourth one-piece frame member of generally L-shaped configuration having a generally horizontal leg attached to said first channel and an upwardly extending leg extending alongside the upwardly extending leg of the third frame member, a second fastener means for detachably connecting the upwardly extending legs on the third and fourth frame members,
 c. clamp means on said upper legs of said first and third frame members for detachably engaging a portion of the frame of a bicycle resting in the channel below the respective upper leg,
 d. and means for mounting the carrier on a vehicle.

8. A bicycle carrier according to claim 7 wherein said frame members are each formed of tubular stock, a longitudinal frame member having downwardly extending legs at opposite ends extending into the upwardly extending legs on said second and fourth frame members to rigidly interconnect the same.

* * * * *